United States Patent [19]

Kilpela

[11] Patent Number: 4,506,778
[45] Date of Patent: Mar. 26, 1985

[54] FLAKE ALIGNER INCLUDING RECIPROCATING BAFFLES

[75] Inventor: Tauno B. Kilpela, Atlantic Mine, Mich.

[73] Assignee: Board of Control of Michigan Technological University, Houghton, Mich.

[21] Appl. No.: 383,828

[22] Filed: Jun. 1, 1982

[51] Int. Cl.³ .............................................. B65G 47/24
[52] U.S. Cl. .................................................. 198/382
[58] Field of Search ............... 198/569, 382, 400, 389, 198/750; 425/83.1, 174.8 E; 264/109, 24, 69

[56] References Cited

U.S. PATENT DOCUMENTS 2,775,994 1/1957 Rowe ........................... 425/83.1 X
3,486,608 12/1969 Rogers ............................... 198/750
4,058,201 11/1977 Etzold ............................... 198/382

Primary Examiner—Joseph E. Valenza
Assistant Examiner—Dennis Williamson

[57] ABSTRACT

Apparatus for forming a loosely felted mat of elongated wood flakes, the wood flakes being aligned in parallel relation and parallel to the longitudinal direction of the mat. The apparatus includes a former for depositing wood flakes on a support surface in a uniformly dispersed, loosely felted relation, and a plurality of vertically oriented baffles positioned below the former and in mutually parallel alignment. The baffles are reciprocated in the direction of the mat to cause flakes lying across the baffles to fall between the baffles and to be aligned with the longitudinal direction of the mat.

5 Claims, 4 Drawing Figures

U.S. Patent  Mar. 26, 1985  4,506,778
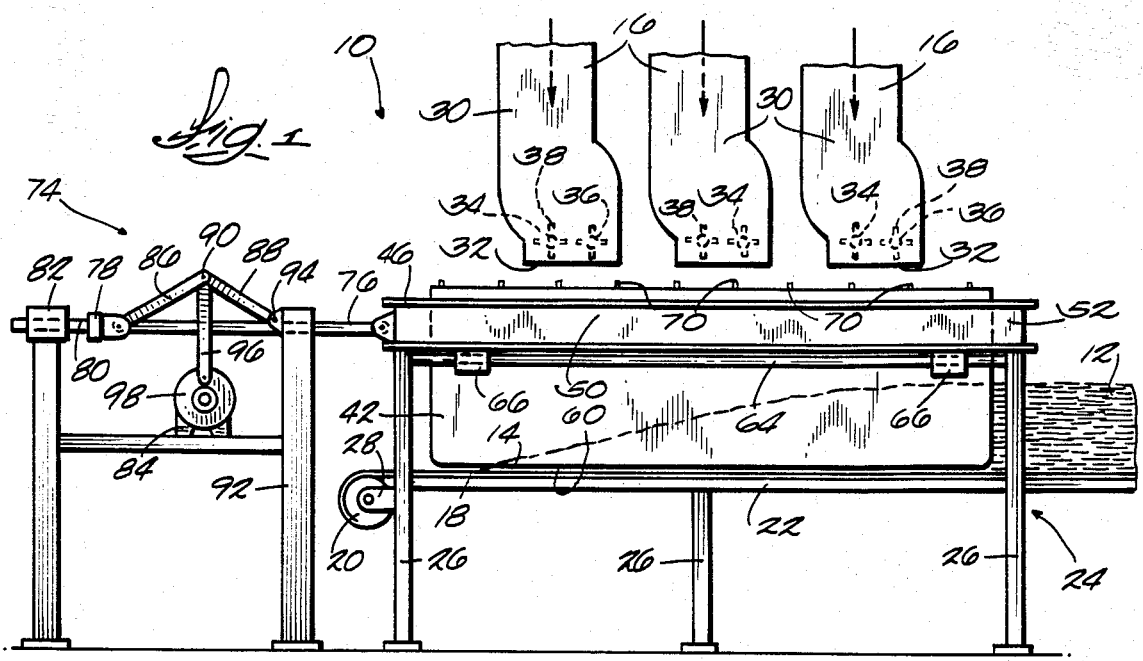
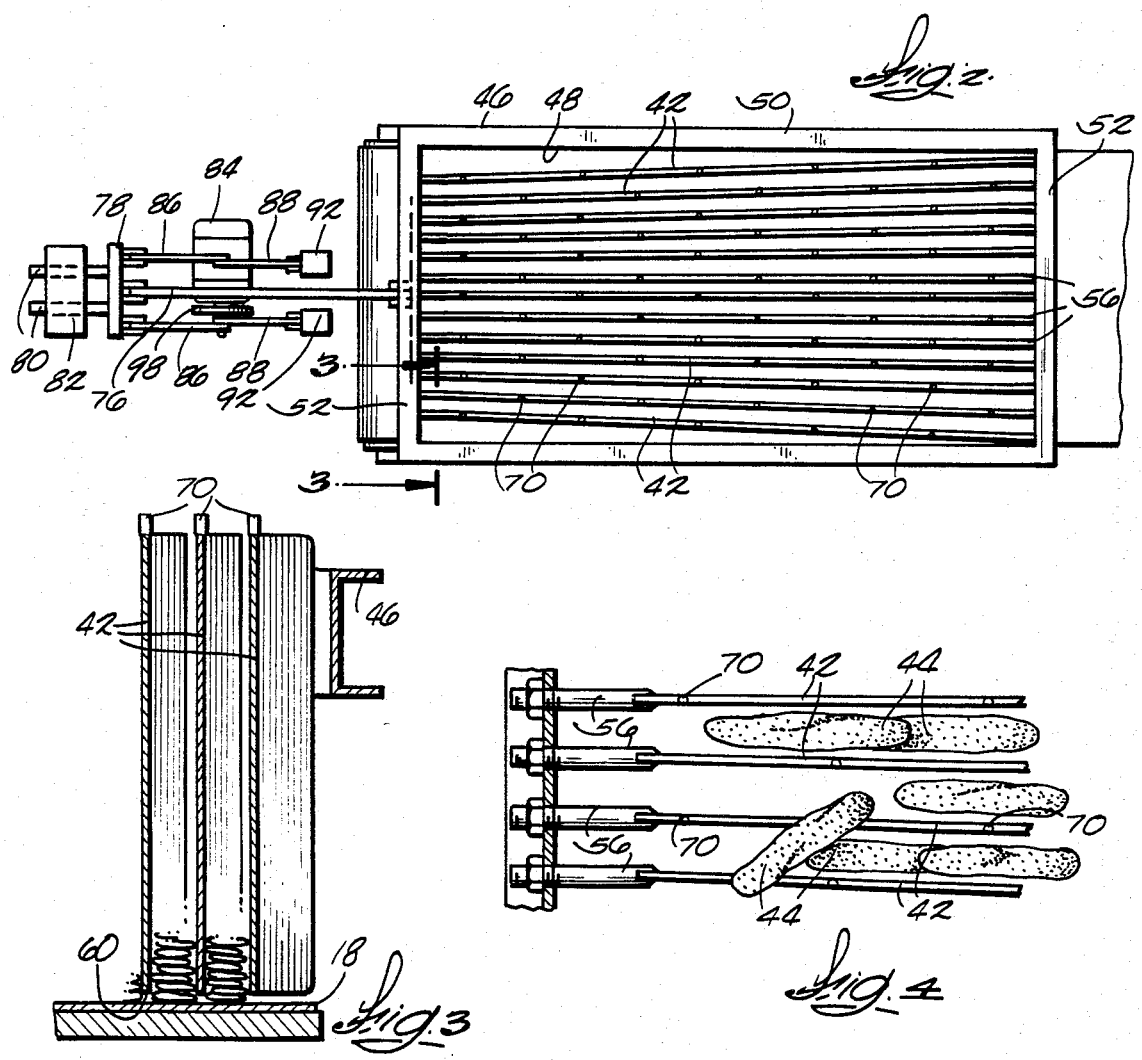

FLAKE ALIGNER INCLUDING RECIPROCATING BAFFLES

FIELD OF THE INVENTION

The invention relates to apparatus for use in making compressed wood particle products and more particularly to apparatus for use in forming loosely felted mats of wood flakes, the mats adapted to be compressed to thereby form composite wood products.

BACKGROUND PRIOR ART

As set forth in the Lund et al. U.S. Pat. No. 4,241,133, issued Dec. 23, 1980 and assigned to the assignee of the present invention, it has been found to be desirable in the construction of compressed or composite wood particle products to employ wood flakes which are very thin and which have a length at least several times their width and to align the wood flakes in mutually parallel alignment and in alignment with the longitudinal axis of the product being produced. This produces a product having substantially improved strength characteristics in the direction of alignment of the wood flakes. The production of such compressed wood products formed from an assembly of wood particles first requires the formation of a loosely felted mat of wood particles. The mat is then compressed to form a densified panel or board. One problem encountered in forming the loosely felted mat is that the alignment or orientation of the elongated wood flakes is made difficult because the wood flakes, which are very light and comparatively fragile, have to be handled en masse, and this has resulted in the clogging of the known machines that were tried for this purpose. Additionally, it has been difficult to produce mats of uniform thickness using prior art machines. Another problem in connection with handling and orienting the wood flakes has been that the flakes tend to be randomly oriented as they fall onto the mat if they are not held in alignment as they are deposited.

Examples of prior art attempts to design suitable apparatus for forming mats of aligned wood particles are set fort in the Elmendorf U.S. Pat. No. 3,478,861, issued Nov. 18, 1969; the Elmendorf U.S. Pat. No. 3,202,743, issued Aug. 24, 1965; the Turner et al. U.S. Pat. No. 3,721,329, issued Mar. 30, 1973; the Urmanov U.S. Pat. No. 3,963,400, issued June 15, 1976; and Canadian Pat. No. 597,941, issued May 10, 1960.

Attention is also directed to the Hostellor U.S. Pat. No. 3,226,764, issued June 4, 1966; the Hostettler U.S. Pat. No. 3,070,838, issued Jan. 1, 1963; the Carlsson et al. U.S. Pat. No. 3,692,612; the Paerels et al. U.S. Pat. No. 3,372,217, issued Mar. 5, 1968; the Axer et al. U.S. Pat. No. 3,824,058, issued July 16, 1974; and the Chapman U.S. Pat. No. 2,992,152, issued July 11, 1961.

SUMMARY OF THE INVENTION

The present invention provides to apparatus for forming continuous lengths of loosely felted mats comprised of aligned wood flakes, such apparatus including improved means for aligning the wood flakes during the formation of the loosely felted mat.

More particularly, the invention includes an apparatus for forming a loosely felted mat of elongated wood flakes, the wood flakes being aligned in parallel relation and parallel to the longitudinal direction of the mat. The apparatus comprises means positioned above a support surface and for depositing wood flakes onto the support surface in a uniformly dispersed, loosely felted relation, and means between the support surface and the depositing means for aligning the elongated wood flakes in mutually parallel alignment as the wood flakes are deposited on the supporting surface. The aligning means includes a plurality of planar baffles, means for supporting the baffles in mutually spaced apart parallel relation and defining vertical planes. Means are also provided for causing reciprocal movement of the baffles in a direction parallel to the planes defined by the baffles.

One of the features of the invention is the provision of a plurality of projections integrally joined to the upper edges of the baffles and extending upwardly therefrom, the projections being spaced apart along the length of the baffles and being adapted to engage the wood flakes as the baffles move.

In one embodiment of the invention the supporting surface is formed by a caul sheet comprised of an elongated length of a flexible material, the flexible material being wound on a spool and being adapted to be unwound from the spool and pulled along continuously beneath the baffles and to support a continuous loosely felted mat of wood flakes.

In one embodiment of the invention, the means for moving the baffles in reciprocating relation includes means for causing acceleration of the baffles as the baffles move in the direction of movement of the caul sheet, a sudden reverse in the direction of movement of the baffles, and a decrease in the speed of the baffles as the baffles move in a direction opposite to the direction of movement of the caul sheet.

One of the advantages of the present invention is that the elongated wood flakes being deposited on the supporting surface are held in mutually parallel alignment as they fall onto the supporting surface and as additional flakes are deposited, and the flakes are not permitted to become misaligned. In a preferred form of the invention the elongated wood flakes are very thin, for example 0.020 inch in thickness, and if the flakes are not held in alignment as they fall onto the supporting surface, they tend to whirl and become misaligned.

Various other features and advantages of the invention will be apparent by reference to the following description of a preferred embodiment, from the claims and from the drawings.

BRIEF DESCRIPTION OF THE DRAWINGS

FIG. 1 is an elevation view of an apparatus embodying the invention.

FIG. 2 is a plan view of the flake aligning apparatus shown in FIG. 1;

FIG. 3 is a cross section view taken along line 3—3 in FIG. 2.

FIG. 4 is an enlarged view of a portion of the apparatus illustrated in FIG. 2.

Before describing a preferred embodiment of the invention in detail, it is to be understood that the invention is not limited in its application to the details of construction nor to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is an apparatus 10 embodying the present invention and for use in forming a loosely felted mat 12 of wood flakes, the mat 12 being adapted to be compressed to thereby form a densified composite wood product. More particularly, the apparatus 10 illustrated in FIG. 1 includes a means providing a supporting surface 14 adapted to support a loosely felted mat of aligned wood flakes. The supporting surface 14 is adapted to receive wood flakes dispensed from a plurality of flake formers 16 and is adapted to support the flakes as the mat 12 is gradually built up. As the mat 12 is built up to a suitable thickness, it is conveyed to a press apparatus (not shown) to be compressed and to form a composite wood product. In the illustrated construction, the supporting surface 14 is formed by the upper surface of a continuous caul screen 18 which is positionable under the formers 16 and is adapted to convey the mat 12 to the press apparatus. The caul screen 18 is comprised of a continuous length of a flexible material or substate wound on a storage roll 20. While the continuous caul screen 18 could be comprised of various materials, suitable materials could include wire screen, paper, plastic film, or metal foils. Means are also provided for supporting that portion of the caul screen 18 adapted to receive the wood flakes during formation of the loosely felted mat. While various means could be provided, in the illustrated construction a horizontal plate 22 is rigidly supported by a frame assembly 24 including a plurality of rigid vertical legs 26, the horizontal plate 22 being positioned such that the caul screen 18 can slide along the upper surface of the plate 22. The storage roll 20 is rotatably supported by brackets 28 fixed to legs 26 and rotatably supporting the opposite ends of the storage roll. Means are also provided for continuously drawing the caul screen 18 across the upper surface of the horizontal plate 22 as wood flakes are deposited thereon to build up a loosely felted mat 12 of the desired thickness and to also move the mat 12 so formed to a press wherein the mat is compressed to form a densified composite wood product.

While in the illustrated construction the means for depositing the wood flakes on the caul screen 18 to form the continuous mat 12 is shown as being comprised by the three formers 16 arranged in series along the caul screen and aligned in the direction of movement of the caul screen, it should be understood that in other arrangements various other conventional means for depositing wood flakes could be employed. For example, any conventional apparatus employed to deposit wood chips as in the manufacture of chipboard or particleboard could also be employed with the structure of the invention. Since the formers 16 are generally conventional, they will not be described in detail. However, in the illustrated construction, the formers 16 each include a housing comprising a hopper 30 adapted to contain a quantity of furnish comprised of wood flakes mixed with a suitable quantity of binder. An opening 32 is provided in the bottom of the hopper 30, and the wood flakes of the furnish are intended to drop through opening 32 and to be disbursed in a uniform pattern. A plurality of rotatable picker rolls 34 are housed in the bottom of the hopper 30 and function to control the amount of furnish deposited by the hopper and to cause any clumps of flakes to be broken up so that the wood flakes are evenly disbursed. The picker rolls 34 include a central rotatable shaft 36 and a plurality of pins 38 extending radially outwardly from the central rotatable shaft 36. Means are also provided for causing the shaft 36 to be rotatably driven such that the picker rolls 34 will properly break up any clumps of wood flakes and such that they will evenly disburse the wood flakes over the supporting surface 14.

As set forth in the U.S. Lund et al. patent referred to above, in the construction of an elongated structural member of the type described there, for best results the wood flakes employed in making the composite wood product should have an average length of about 0.5 inch to about 3.5 inches, preferably about 1 inch to about 2 inches, and an average thickness of about 0.01 to 0.05 inch, preferably about 0.015 to about 0.025 inch and most preferably about 0.02 inch. Flakes longer than 3.5 inches tend to curl which hinders proper alignment during the mat formation, and it is difficult to insure that flakes shorter than about 0.5 inch do not become aligned with their grain direction crosswise to the longitudinal direction of the product being formed. Flakes thinner than about 0.01 inch tend to require excessive amounts of binder to obtain adequate bonding, and flakes thicker than about 0.05 inch are relatively stiff and tend to require excessive compression to obtain the desired intimate contact therebetween. To facilitate proper alignment of the flakes in mutually parallel relation and parallel to the longitudinal axis of the mat being formed, the flakes should have a length which is several times their width, preferably about 4 to about 10 times. Using this constraint as a guide, the average width of the flakes generally should be about 0.1 to about 0.5 inch.

A suitable furnish is formed by introducing flakes of the size described above into a conventional blender wherein predetermined amounts of a binder are applied to the flakes as they are tumbled or agitated in the blender. Suitable binders include those used in the manufacture of particleboard and similar pressed fiberous products and other chemical bonding systems. Resinous particleboard binders presently are preferred. Representative examples of suitable binders include thermosetting resins such as phenol-formaldehyde, resorcinol-formaldehyde, melamineformaldehyde, urea-formaldehyde, urea-furfuryl and condensed furfuryl alcohol resins, and organic polyisocyanates including those curable at room temperatures, either alone or combined with urea or melamine-formaldehyde resins.

As previously stated, it is advantageous in many applications that the elongated wood flakes in the composite product be oriented such that substantially all of the elongated wood flakes are aligned in substantially parallel relation and with their longitudinal axes substantially parallel to the longitudinal axis of the elongated mat being formed.

Accordingly, means are provided by the present invention for causing flakes being deposited to be aligned as they are dropped by the former onto the supporting surface 14. The means for aligning the flakes includes a plurality of baffles 42 positioned above the supporting surface 14, the baffles 42 each defining a vertical plane, and the baffles 42 being positioned in closely adjacent side-by-side parallel relation, each of the baffles 42 being generally aligned with the direction of movement of the mat 12 and the caul screen 18. While the baffles 42 can have various constructions, in the illustrated arrangement they comprise thin planar sheet metal plates positioned so as to define vertical planes. The baffles are elongated and their longitudinal axes are positioned generally horizontally and generally parallel to the longitudinal direction of movement of the caul screen 18 and of the mat 12.

In operation of the flake aligning device, the wood flakes from the formers 16 are intended to drop between the baffles 42 and to be aligned by the baffles such that substantially all of the elongated flakes 44 are aligned with their axes being substantially parallel to one another and parallel to the longitudinal axis of the mat 12 being formed. Such alignment of the flakes is accomplished by positioning the baffles 42 in closely spaced parallel relation, the baffles 42 being spaced apart sufficiently that the flakes 44 may fall between the baffles, with each flake being oriented with its major plane in horizontal relation but with the baffles positioned sufficiently close together that the elongated flakes 44 are held in closely spaced parallel relation. The relationship between the size of the wood flakes and the spacing between the baffles 42 is illustrated in FIG. 4 wherein a majority of the elongated flakes 44 are shown as being aligned with the planes of the baffles 42 and one such flake is shown lying across a pair of baffles.

Means are also provided for supporting the vertical baffles 42 in such parallel relation. In the illustrated construction, the means for supporting includes a rigid baffle frame 46 supported above the supporting surface 14, the baffle frame 46 being rectangular and including a central rectangular opening 48 housing the vertical baffles.

In the illustrated arrangement, the baffle frame 46 includes a pair of side members 50 rigidly joined together by a pair of transverse cross or end members 52. The side members 50 extend parallel to the longitudinal direction of movement of the caul screen 18. The baffles 46 are supported in the rectangular opening 48 in spaced apart relation across the entire width and in mutually spaced relation. More particularly, the baffles 42 are rigidly supported at their opposite ends by pairs of rods 56 fixedly joined to the baffles 42 and to the end members 52 of the rigid baffle frame 46, and the baffles 42 being supported such that they extend downwardly from the frame 46 toward the supporting surface. The frame 46 is positioned above the supporting surface 14 of the caul screen 18 by a distance at least as great as that of the desired thickness of the mat 12 to be formed.

As also illustrated in the drawings, the baffles 42 are positioned such that their lower edges 60 are closely spaced to the caul screen 18. As a result, the flakes 44 being deposited on the caul screen 18 are held in alignment throughout the formation of the loosely felted mat 12 and they are not permitted to become misaligned as they fall from the former onto the mat.

The baffles 42 are also supported by the frame 46 such that the baffles fan out slightly at their discharge end, i.e. that portion of the baffles 42 at the right as seen in FIG. 2, such that the friction between the mat 12 of wood flakes and the baffles 42 is reduced at that end of the baffles, whereby the mat may exit from the baffles smoothly. It will be recognized by those skilled in the art that, for convenience of illustration, the spacing between the illustrated baffles 42 is exaggerated, and the angle of the baffles with respect to the direction of movement of the caul screen 18 is also exaggerated.

Means are also provided for supporting the baffle frame 46 for rapid reciprocal movement. While this support means could have various constructions, in the illustrated arrangement the frame 24 includes a pair of horizontally extending support bars 64 positioned on opposite sides and above the moving caul screen 18, the support bars 64 extending in the direction of movement of the moving caul screen. The frame 46 includes pairs of flanges 66 extending from the lateral sides of the frame 46 and adapted to ride on the support bars 64 so as to support the frame 46 for reciprocal slideable movement along the support bars 64.

In operation of the apparatus of the invention, as the formers 16 deposite the elongated wood flakes 44 onto the baffles 42, and while some of the wood flakes will have an orientation permitting them to fall into the gaps between the baffles 42, many of the flakes will not be aligned with the baffles, and will lie across the upper edges of the baffles as illustrated in FIG. 4. By providing reciprocal movement of the baffles 42, those flakes which fall across the baffles will tend to become aligned with the baffles and fall between the baffles.

Such alignment of the flakes 44 is aided by the provision of a plurality of vertically extending pins 70 arranged in a staggered pattern along the parallel upper edges of the baffles 42 and being rigidly joined to those upper edges of the baffles. In operation, as the baffles 42 reciprocate, the pins 70 will contact those flakes 44 lying across the baffles and will cause those flakes to rotate into alignment with the baffles 42, thereby permitting them to fall between the baffles. It should be noted that the pins 70 are spaced apart along the lengths of the baffles by a distance greater than the lengths of the flakes 44 and sufficient that the pins 70 will not prevent the flakes from becoming aligned with the baffles.

Referring more particularly to the means for causing reciprocal movement of the baffles 42, that means comprises a motor driven toggle assembly 74 which functions to cause an increase in the velocity of the baffles 42 as they move in the direction of movement of the caul sheet 18, a sudden reversal in the direction of movement as the baffles 42 reach the end of their stroke, and then a decrease in velocity as the baffles move in a direction opposite the direction of movement of the mat 12. In other words, there is first a sudden reversal in the direction of movement of the baffles 42 and then a decrease in the velocity of the baffles as they move in the opposite direction. The baffles first slow to a zero velocity and then move in the direction opposite to the movement of the mat. Then there is a decrease in the velocity of the baffles as they move in that direction opposite to the direction of the mat. The means for causing movement of the baffles in this manner is similar to the apparatus employed in conventional Wilfley tables used in native copper concentrators.

More particularly, the means for causing reciprocation of the baffles includes a baffle frame drive link or rod 76 having one end pivotally connected to the baffle frame 46 and an opposite end connected to a crosshead 78. Means are also provided for supporting the crosshead 78 for horizontal reciprocal movement wherein the crosshead 78 can drive the baffle frame drive link 76 and the baffle frame 46. The means for supporting the crosshead 78 includes a pair of generally horizontal bars 80 fixed to the crosshead 78 and slideably supported in complementary aligned bores in a supporting frame 82. In the illustrated construction, the crosshead 78 is driven in reciprocating relation by a toggle arm assembly and a motor 84. The toggle arm assembly includes two pairs of toggle arms 86 and 88, the arms of respective pairs being pivotably joined together by a pivot pin 90. The toggle arms 88 of each pair are pivotally joined to a rigid support 92 by a pin 94 and the other toggle arm 86 is pivotally joined to the crosshead 78. A connecting rod 96 is connected by the pivot pins 90 to one of the pairs of toggle arms 86 and 88. The lower end of the connecting rod 96 is connected to the periphery of driven disc 98. The driven disc 98 is rotatable about an axis parallel to the axis of the pivot pin 90 and the electric motor 84 is provided for rotatably driving the disc 98 so as to cause general vertical movement of the connecting rod 96. Such vertical movement of the connecting rod 96 will cause movement of the toggle arms from the position shown in FIG. 1 to a position wherein the toggle arms 86 and 88 are colinear. This causes reciprocal movement of the crosshead 78 and consequent movement of the link 76 and the frame 46 in the manner described.

Another advantage of the apparatus described above is that the reciprocating motion of the baffles 42 in the manner caused by the toggle assembly 74 facilitates movement of the mat 12 with the caul screen 18 as the mat is formed and prevents the wood flakes 44 from being retained between the baffles 42.

Various features of the invention are set forth in the following claims.

I claim:

1. Apparatus for forming a loosely felted mat of elongated wood flakes, the mat having a longitudinal direction, and the wood flakes being aligned in parallel relation and parallel to the longitudinal direction of the mat, said apparatus comprising, means defining a support surface for supporting the loosely felted mat of wood flakes;

means positioned above said support surface and for depositing wood flakes on said support surface in a uniformly dispersed, loosely felted relation; and means between said support surface and said depositing means and for aligning said elongated wood flakes in mutually parallel alignment as said wood flakes are deposited on said support surface, said aligning means including a plurality of planar baffles each having opposite ends, means for supporting said baffles in spaced mutually parallel relation and defining vertical planes, said baffles being supported such that the spaces between said baffles at one end are greater than the spaces between the opposite ends of said baffles, and means for causing reciprocal movement of said baffles in a direction parallel to the planes defined by said baffles and in the longitudinal direction of the mat, said means for causing reciprocal movement of said baffles including means for causing movent of all of said baffles in a first direction in unison and then movement of all of said baffles in an opposite direction in unison, and said means for causing reciprocal movement of said baffles including a first rigid arm having opposite ends and a second rigid arm having opposite ends, means for pivotally joining one end of said first rigid arm to one end of said second rigid arm, means for pivotably connecting said one end of said first rigid arm and said one end of said second rigid arm to the periphery of a disc, said disc being supported for rotation about a horizontal axis transverse to said longitudinal direction, said means for connecting including a vertically extending third rigid arm having one end pivotally connected to said one end of said first rigid arm, and said third rigid arm having an opposite end pivotally connected to said disc in spaced relation from said horizontal axis whereby rotation of said disc causes vertical reciprocal movement of said third rigid arm and vertical reciprocal movement of said one end of said first rigid arm and said one end of said second rigid arm, means for rotatably driving said disc, means for pivotally connecting an opposite end of said first rigid arm to a fixed member, and means for connecting an opposite end of said second arm to said baffles to cause reciprocal movement of said baffles in response to rotation of said disc about said horizontal axis.

2. An apparatus as set forth in claim 1 wherein said baffles include upper edges, and wherein said means for aligning further includes means for causing flakes falling onto said upper edges of said baffles to be aligned substantially parallel to said baffles and to fall between said baffles.

3. Apparatus as set forth in claim 2 wherein said means for causing said flakes to be aligned substantially parallel to said baffles includes a plurality of projections integrally joined to said upper edges of said baffles and extending upwardly therefrom, said projections being spaced apart along the length of said baffles.

4. Apparatus as set forth in claim 1 wherein said support surface comprises an elongated sheet of flexible material, said sheet of flexible material being wound on a roll, and further including means for causing said flexible material to be continuously pulled under said depositing means as said depositing means deposits wood flakes on said flexible sheet.

5. Apparatus as set forth in claim 1 wherein said means for causing reciprocal movement of said baffles includes a first rigid arm having opposite ends and a second rigid arm having opposite ends, means for pivotally joining one end of said first rigid arm to one end of said second rigid arm, means for pivotably connecting said one end of said first rigid arm to the periphery of a disc, said disc being supported for rotation about a horizontal axis transverse to said longitudinal direction, means for rotatably driving said disc, means for pivotally connecting an opposite end of said first rigid arm to a fixed member, and means for connecting an opposite end of said second arm to said baffles.

* * * * *